Patented Apr. 17, 1945

2,373,952

UNITED STATES PATENT OFFICE 2,373,952

β-ERYTHROIDINE AND ITS HYDROHALIDES, AND A PROCESS FOR THEIR PRODUCTION

Karl Folkers, Plainfield, and Randolph T. Major, Mountainside, N. J., assignors to Merck & Co., Inc., Rahway, N. J., a corporation of New Jersey No Drawing. Application November 13, 1942, Serial No. 465,461

8 Claims. (Cl. 260—236)

This invention relates to a physiologically active alkaloid, and to processes for its production.

The alkaloid of the present invention exhibits a potent curare-like action, and has been found to be particularly useful for the release of spasm and plastic muscular rigidity in patients afflicted with spastic paralysis, and for modification of the severity of metrazol convulsions, thereby preventing fracture in the convulsive therapy of the psychoses. It is being used with notable success in the field of "shock therapy."

In a co-pending application, Serial No. 391,096, filed April 30, 1941, we have described a new Erythrina alkaloid which we have called "erythroidine." "Erythroidine" has the empirical formula $C_{16}H_{19}NO_3$, is a lactone which is susceptible to destruction by strong alkali, forms a crystalline hydrochloride melting at about 232° C., usually in the range of 223–232° C., and is a mixture of stereoisomers.

The present application is more particularly concerned with one of the stereoisomers of "erythroidine," which we have called β-erythroidine. β-Erythroidine is an alkaloidal substance which is a lactone and which, in its substantially pure form, has a melting point of about 99.5–100° C.; $[\alpha]_D^{25} = +88.8$, water.

According to our invention, β-erythroidine may be obtained by crystallization, preferably repetitive, of a salt or hydrohalide of the stereoisomeric mixture "erythroidine" from a solvent such as ethanol or methanol, and preferably absolute ethanol or methanol. A corresponding salt or hydrohalide of β-erythroidine is thus obtained. In some instances, such salt or hydrohalide may be obtained as a hemihydrate, or it may be accomplished by alcohol of crystallization, in which case the anhydrous form may be obtained by drying.

The base, β-erythroidine, may be recovered from such salt or hydrohalide by dissolving the latter in water, rendering the solution weakly alkaline, as for example by the addition thereto of sodium bicarbonate, and exhaustively extracting with a solvent such as chloroform, for instance.

It is, of course, possible to utilize the base β-erythroidine as starting material for the production of a wide variety of derivatives. The following derivatives are illustrative of those which may be produced either by treating the corresponding derivative of "erythroidine" as described, or by reacting the base, β-erythroidine, with appropriate reagents:

β-Erythroidine hydrochloride hemihydrate; M. P. 229.5–230° C. (decomp.).
β-Erythroidine hydrochloride, anhydrous; M. P. 232° C. (decomp.), $[\alpha]_D^{25} = +109.0$, water.
β-Erythroidine hydrobromide containing one-half molecule of ethanol; M. P. 227° C.
β-Erythroidine hydrobromide, anhydrous; M. P. 222.5° C.; $(\alpha)_D^{25} = +111.2$, water.
β-Erythroidine hydriodide, anhydrous; M. P. 206° C.; $(\alpha)_D^{25} = +108.1$, water.
β-Erythroidine perchlorate; M. P. 203–203.5° C; $(\alpha)_D^{25} = +96.3$, water.
β-Erythroidine flavianate; M. P. 216–216.5° C.

Alkali and alkaline earth metal salts of the acid corresponding to the lactone, β-erythroidine, may be obtained by treating said β-erythroidine in aqueous solution, with an appropriate alkalinizing agent as, for example, sodium hydroxide.

This application is a continuation-in-part of our application Serial No. 233,412, filed October 5, 1938.

Modifications may be made in carrying out the present invention, without departing from the spirit and scope thereof, and we are to be limited only by the appended claims.

We claim:

1. The process for the production of β-erythroidine which in its substantially pure form has a melting point of about 99.5–100° C.; $(\alpha)_D^{25} = +88.8$, water, and which is a stereoisomer of "erythroidine," said "erythroidine" being an alkaloidal substance of formula $C_{16}H_{19}NO_3$, and identical with the alkaloid "erythroidine" obtained from *Erythrina americana*, comprising crystallizing a substance selected from the group consisting of acid salts and hydrohalides of "erythroidine" from a solvent selected from the group consisting of ethanol and methanol, and recovering β-erythroidine.

2. The process for the production of β-erythroidine which in its substantially pure form has a melting point of about 99.5–100° C.; $(\alpha)_D^{25} = +88.8$, water, and which is a stereoisomer of "erythroidine," said "erythroidine" being an alkaloidal substance of formula $C_{16}H_{19}NO_3$, and identical with the alkaloid "erythroidine" obtained from *Erythrina americana*, comprising repeatedly crystallizing a substance selected from the group consisting of acid salts and hydrohalides of "erythroidine" from a solvent selected from the group consisting of ethanol and methanol, and recovering β-erythroidine.

3. The process for the production of β-erythroidine which in its substantially pure form has a melting point of about 99.5–100° C.; $(\alpha)_D^{25} = +88.8$, water, and which is a stereoisomer of "erythroidine," said "erythroidine" being an alkaloidal substance of formula $C_{16}H_{19}NO_3$, and identical with the alkaloid "erythroidine" obtained from *Erythrina americana*, comprising crystallizing the hydrochloride of "erythroidine" from a solvent selected from the group consisting of ethanol and methanol, and recovering β-erythroidine.

4. The process for the production of β-erythroidine which in its substantially pure form has a melting point of about 99.5–100° C.; $(\alpha)_D^{25} = +88.8$, water, and which is a stereoisomer of "erythroidine," said "erythroidine" being an alkaloidal substance of formula $C_{16}H_{19}NO_3$, and identical with the alkaloid "erythroidine" obtained from *Erythrina americana*, comprising repeatedly crystallizing the hydrochloride of "erythroidine" from a solvent selected from the group consisting of ethanol and methanol, and recovering β-erythroidine.

5. A product selected from the group consisting of β-erythroidine an alkaloidal substance of formula $C_{16}H_{19}NO_3$, which in its substantially pure form has a melting point of about 99.5–100° C.; $(\alpha)_D^{25} = +88.8$ water, and which is identical with the β-erythroidine obtained from species of Erythrina; and salts and hydrohalides of said β-erythroidine.

6. The hydrochloride of β-erythroidine, which β-erythroidine is an alkaloidal substance of formula $C_{16}H_{19}NO_3$ which, in its substantially pure form has a melting point of about 99.5–100° C.; $(\alpha)_D^{25} = +88.8$, water, and which is identical with the β-erythroidine obtained from species of Erythrina.

7. The hydrobromide of β-erythroidine, which β-erythroidine is an alkaloidal substance of formula $C_{16}H_{19}NO_3$ which, in its substantially pure form has a melting point of about 99.5–100° C.; $(\alpha)_D^{25} = +88.8$, water, and which is identical with the β-erythroidine obtained from species of Erythrina.

8. As a new product, β-erythroidine, which in its substantially pure form has a melting point of about 99.5–100° C.; $(\alpha)_D^{25} = +88.8$, water, and which is identical with the β-erythroidine obtained from species of Erythrina.

KARL FOLKERS.
RANDOLPH T. MAJOR.